(No Model.)
G. L. BAKER.
SCRAPER ATTACHMENT FOR CULTIVATORS.
No. 310,974. Patented Jan. 20, 1885.
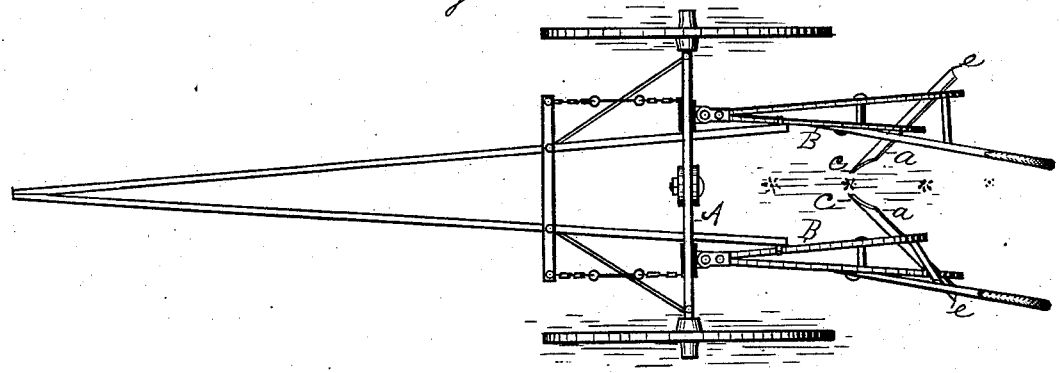
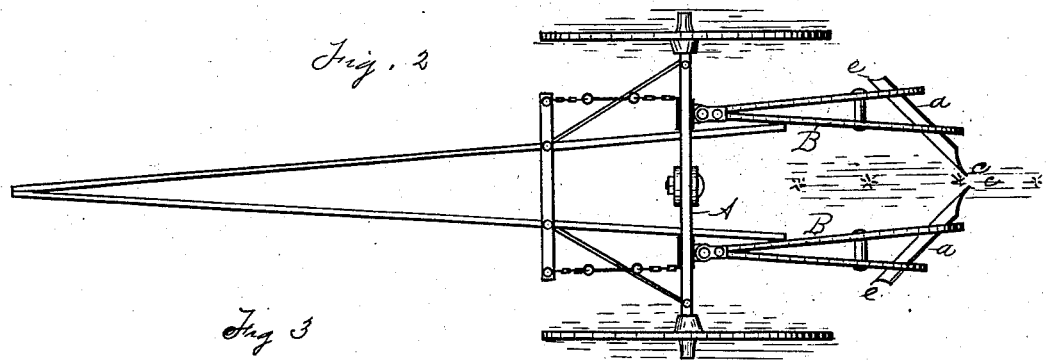
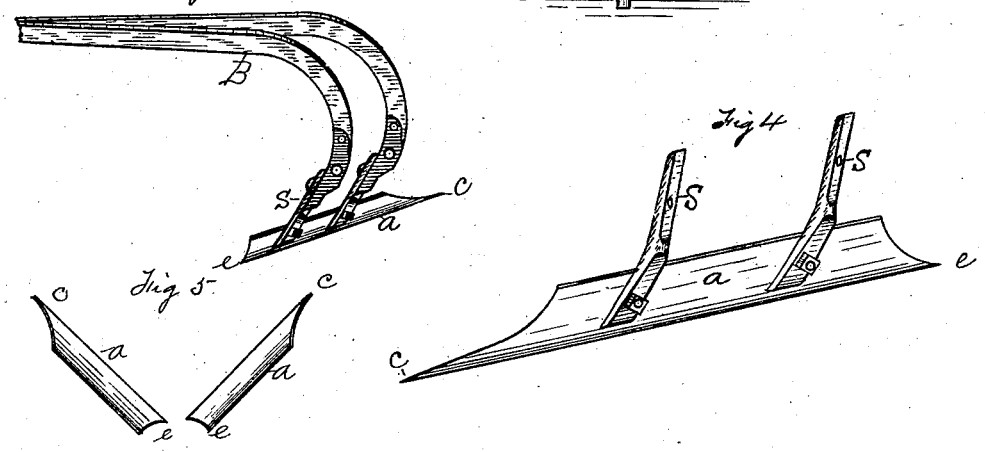
Witnesses
Thos. H. Hutchins
Wm. J. Hutchins
Inventor
George L. Baker

UNITED STATES PATENT OFFICE.

GEORGE L. BAKER, OF CABERY, ILLINOIS.

SCRAPER ATTACHMENT FOR CULTIVATORS.

SPECIFICATION forming part of Letters Patent No. 310,974, dated January 20, 1885.

Application filed June 9, 1884. (No model.)

*To all whom it may concern:*

Be it known that I, GEORGE L. BAKER, a citizen of the United States of America, residing at Cabery, in the county of Ford and State of Illinois, have invented certain new and useful Improvements in Scraper Attachments for Cultivators, of which the following is a specification, reference being had therein to the accompanying drawings.

Figures 1 and 2 are plan views on the top; Fig. 3, a perspective view of one of the beams and its scraper detached from the machine; Fig. 4, a perspective view of one of the scrapers, together with its attaching-standards, detached from the machine; Fig. 5, a perspective view of the scraper-shovels, showing their relative positions with each other and their form.

This invention relates to certain improvements in scraper attachments for cultivators, which improvements are fully set forth and explained in the following specification and claims.

Referring to the drawings, Figs. 1 and 2 show the frame of an ordinary two-wheeled cultivator having a suitable axle and tongue and means for attaching a team to draw the same. A pair of ordinary plow-beams, B B, are pivoted to the axle A in any manner, or to any convenient part, and are of the pattern and form shown in Fig. 3, and intended to be made of metal.

The views show the ordinary shovels, that usually are attached to the beams, removed and substituted by a pair of scraper-blades, *a*. These blades have standards S, to which they are bolted in the usual manner, which standards are designed to be bolted to the plow-beams, as is shown in Fig. 3. By this method of attachment the blades *a* may be attached to a great majority of the cultivators in use, in place of the ordinary shovels, when it is desired to use the cultivator as a scraper. The plow-beams B B are intended to be interchangeable with each other, so as to cause the scrapers to throw the dirt toward the row or the reverse to throw it away. Fig. 1 shows the beams set so as to run the point of the scraper-blades near the row, and have their heels diverge to throw the dirt away, and Fig. 2 shows the plow-beams interchanged with each other to cause the scrapers to throw the dirt to the row to hill it up. The points of the scrapers are cut away to leave a long narrow nose, *c*, as is shown in Fig. 4, so that when the shovels run with the point to the row, as shown in Fig. 1, the point can run very near the hill or row, and the scraper will simply shave the surface of the ground to cut off or plow up the weeds, and the earth will fall over the narrow nose *c* and not be thrown away from the row, thus permitting it to lie where it originally was, a short distance from the young plant. The heels of the scrapers are curved, as shown at *e*, so as to leave a shorter pointed nose, so that when the plow-beams are reversed, as shown in Fig. 2, the scrapers may hill up the row, but not cover up the young plant by reason of the loose earth falling over the short nose at said heel. It is in the interchangeable use of these scraper-blades, having such points and adapted to be applied to almost any cultivator instead of the ordinary shovels, that my invention consists, the design being to use such a device as is shown in Fig. 4 as an attachment to an ordinary cultivator, and thus save the necessity of having an independent scraper-cultivator. The peculiar form of these scraper-blades I deem to be very necessary, and also forming a part of my invention.

I am aware of the use of the ordinary scraper-cultivators for hilling up the row when the plant has attained sufficient size and strength to permit it, which, of course, I do not claim as such; but I am not aware of the interchangeable use of such scraper-blades as these described as an attachment to any ordinary cultivator.

Having thus described my invention, what I claim as new, and desire to secure by Letters Patent, is as follows:

1. As an attachment for cultivators, the scraper-blades *a a*, having the points *c* and *e*, and standards S S, in combination with the interchangeable beams B B, as and for the purpose set forth.

2. The combination of the scraper-blades *a a*, having the points *c e*, interchangeable plow-beams B B, and axle A, as and for the purpose set forth.

GEORGE L. BAKER.

Witnesses:
MOSES SPAFFORD,
GEO. SCHUMACHER.